United States Patent
Aljadeff

(10) Patent No.: US 9,632,898 B2
(45) Date of Patent: Apr. 25, 2017

(54) METHODS AND SYSTEMS FOR CALCULATING AND PRESENTING A POSITIONING PERFORMANCE OF A LOCATING SYSTEM

(71) Applicant: AeroScout Ltd., Rehovot (IL)

(72) Inventor: Daniel Aljadeff, Kiriat Ono (IL)

(73) Assignee: AeroScout Ltd., Ness-Ziona (IL)

( * ) Notice: Subject to any disclaimer, the term of this patent is extended or adjusted under 35 U.S.C. 154(b) by 447 days.

(21) Appl. No.: 14/133,880

(22) Filed: Dec. 19, 2013

(65) Prior Publication Data

US 2014/0188432 A1 Jul. 3, 2014

Related U.S. Application Data

(60) Provisional application No. 61/747,644, filed on Dec. 31, 2012.

(51) Int. Cl.
| | |
|---|---|
| G06F 11/30 | (2006.01) |
| G21C 17/00 | (2006.01) |
| G01S 5/02 | (2010.01) |

(52) U.S. Cl.
CPC ........... *G06F 11/3003* (2013.01); *G01S 5/02* (2013.01); *G01S 5/0221* (2013.01)

(58) Field of Classification Search
CPC ............ G06Q 10/0833; G06Q 10/087; G06Q 10/083; G06Q 10/0832; G06Q 10/0835; G06Q 10/08355; G06Q 10/0836; G06Q 10/0838; G06Q 20/14; G06Q 20/22; G06Q 20/325; G06Q 20/40; G06Q 30/0269; G06Q 10/08
See application file for complete search history.

(56) References Cited

U.S. PATENT DOCUMENTS

| | | | |
|---|---|---|---|
| 8,052,054 B1 * | 11/2011 | Mingrone | G01S 13/723 235/400 |
| 2006/0240840 A1 | 10/2006 | Morgan et al. | |
| 2008/0233973 A1 * | 9/2008 | Gfeller | G01C 21/206 455/456.5 |
| 2010/0228602 A1 | 9/2010 | Gilvar et al. | |
| 2010/0328155 A1 | 12/2010 | Simic et al. | |
| 2012/0265568 A1 * | 10/2012 | Marshall | G06Q 10/06 705/7.11 |

OTHER PUBLICATIONS

Extended European Search Report from related European Application No. EP 13 19 8851, 5 pages.

* cited by examiner

Primary Examiner — Roy Y Yi
(74) Attorney, Agent, or Firm — Adan Ayala

(57) ABSTRACT

Disclosed embodiments provide methods and systems for calculating and presenting a positioning performance of a location system. In one aspect, a server may receive a signal including information indicative of a determined location of an asset. Based on the received signal, the server may determine a positioning error value indicating an error in the determined location of the asset. The server may then calculate a metric as a function of the positioning error value, and provide positioning performance information for display based on the calculated metric.

32 Claims, 8 Drawing Sheets

| Room # | Avg. time to find an asset | Probability to find an asset within 2 min |
|---|---|---|
| 501 | 20 sec | 95% |
| 502 | 65 sec | 75% |
| 503 | 120 sec | 6% |
| 504 | 45 sec | 85% |
| Total | 62.5 sec | 65.75% |

Assembly area – Rooms 501-504

| Room # | Avg. time to find an asset | Avg. cost to find an asset | Avg. # of assets searched in the room per month | Total searching cost per month |
|---|---|---|---|---|
| 501 | 20 sec | $0.20 | 520 | $104.00 |
| 502 | 65 sec | $0.65 | 180 | $117.00 |
| 503 | 120 sec | $1.20 | 275 | $330.00 |
| 504 | 45 sec | $0.45 | 190 | $85.50 |
| Total | 62.5 sec | | | $636.50 |

| Area | Total searching cost per year |
|---|---|
| Assembly | $7,638 |
| Quality Assurance | $9,325 |
| Warehouse | $18,220 |
| Delivery | $21,456 |
| Total | $56,639 |

FIG. 7

METHODS AND SYSTEMS FOR CALCULATING AND PRESENTING A POSITIONING PERFORMANCE OF A LOCATING SYSTEM

RELATED APPLICATIONS

This application claims priority to U.S. Provisional Patent Application No. 61/747,644, filed on Dec. 31, 2012, the contents of which are incorporated herein by reference.

TECHNICAL

The present disclosure relates to locating systems, and more particularly, to methods and systems for calculating and/or presenting the performance of a real-time locating system.

BACKGROUND OF THE DISCLOSURE

The ability to locate and track assets, such as devices, products, persons, or equipment, is important in many applications and industries. For example, hospitals may wish to track medical equipment and personnel to ensure timely response to emergency situations, manufacturers may wish to track parts in an assembly plant, and warehouses may wish to track supplies. The ability to locate and track assets helps to ensure proper and efficient use of assets in these and other environments, In some applications, assets may be located and tracked using a real-time locating system (RTLS). For example, a wireless tag may be attached to an asset, and one or more fixed network components, such as access points or base stations, may receive wireless signals from the wireless tags to determine the location of the asset. The wireless signals may be received periodically, allowing the location of the asset to be determined dynamically in real-time. Thus, while a location of an asset may change quickly and often in a particular environment, the locating system is provided with real-time updates of the location of the asset.

As noted above, locating systems are provided in a variety of different environments. Today, locating systems measure and present the performance (e.g. accuracy) of the positioning of an asset in units, such as in meters or feet. However, the importance of a particular accuracy level in locating an asset may vary depending on the application of a locating system in a particular environment. For example, improving accuracy by seventy-five percent (e.g., a positioning accuracy of ten centimeters rather than forty centimeters) may not make a significant difference in a hospital environment, and it may not be worth an additional investment to improve the positioning accuracy in such an environment. By contrast, in a system used to locate small items in a store, improving accuracy by seventy-five percent (e.g., accuracy to fifty centimeters rather than two meters) may significantly reduce the searching time to find an item, because there may hundreds of items placed within a small area. Current locating systems do not account for different application environments when providing positioning performance information.

Accordingly, an improved approach to calculating and presenting performance (e.g. accuracy, latency, throughput, etc.) information of a locating system is needed. Methods and systems consistent with the disclosed embodiments address one or more of the problems set forth above.

SUMMARY OF THE DISCLOSURE

The disclosed embodiments include systems and methods for determining positioning performance of a location system. In one embodiment, a computer-implemented method is disclosed for determining a positioning accuracy of a location system. In one aspect, the method may include receiving a signal indicative of a determined location of an asset. The method may also comprise determining, by a processor, a positioning error value based on the received signal, the positioning error value indicating an error in the determined location of the asset. The method may further comprise calculating a metric as a function of the positioning error value and providing positioning accuracy information including the calculated metric.

In another embodiment, a system is disclosed for determining a positioning accuracy of a location system. In one aspect, the system may include at least one memory device storing instructions and at least one processor that, when executing the instructions, is configured to receive a signal indicative of a determined location of an asset. The processor, when executing the instructions, may also be configured to determine a positioning error value based on the received signal, the positioning error value indicating an error in the determined location of the asset. The processor, when executing the instructions, may further be configured to calculate a metric as a function of the positioning error value and provide positioning accuracy information including the calculated metric.

The disclosed embodiments also include a non-transitory computer-readable medium storing instructions that, when executed by a processor, cause the processor to perform a method, the method comprising receiving a signal indicative of a determined location of an asset. The method may also include determining a positioning error value based on the received signal, the positioning error value indicating an error in the determined location of the asset. The method may further include calculating a metric as a function of the positioning error value and providing positioning accuracy information including the calculated metric.

It is to be understood that the disclosed embodiments are not limited to the details of construction and to the arrangements set forth in the following description or illustrated in the drawings. The disclosed embodiments may include additional aspects in addition to those described and is capable of being practiced and carried out in various ways. Also, it is to be understood that the phraseology and terminology employed herein, as well as in the abstract, are for the purpose of description and should not be regarded as limiting.

The accompanying drawings, which are incorporated and constitute part of the specification, illustrate certain embodiments of the disclosure, and together with the description, serve to explain exemplary principles of the disclosed embodiments.

As such, those skilled in the art will appreciate that the conception upon which this disclosure is based may readily be utilized as a basis for designing other structures, methods, and/or systems for carrying out the several purposes of the present disclosure. It is important, therefore, to recognize that the claims should be regarded as including such equivalent constructions insofar as they do not depart from the spirit and scope of the present disclosure.

BRIEF DESCRIPTION OF THE DRAWINGS

FIG. 6 is a diagram reflecting a listing of exemplary positioning accuracy information, consistent with disclosed embodiments.

FIG. 7 is a diagram reflecting additional listings of exemplary positioning accuracy information, consistent with disclosed embodiments.

DETAILED DESCRIPTION

Reference will now be made in detail to the present embodiments of the disclosure, certain examples of which are illustrated in the accompanying drawings.

The methods and systems consistent with the disclosed embodiments may calculate and/or present a positioning performance of a locating system based on a positioning error and/or one or more parameters. In one aspect, the locating system may be implemented in a wireless network. In one embodiment, the locating system may be a real-time locating system, though the disclosure is not so limited.

Figure 1:
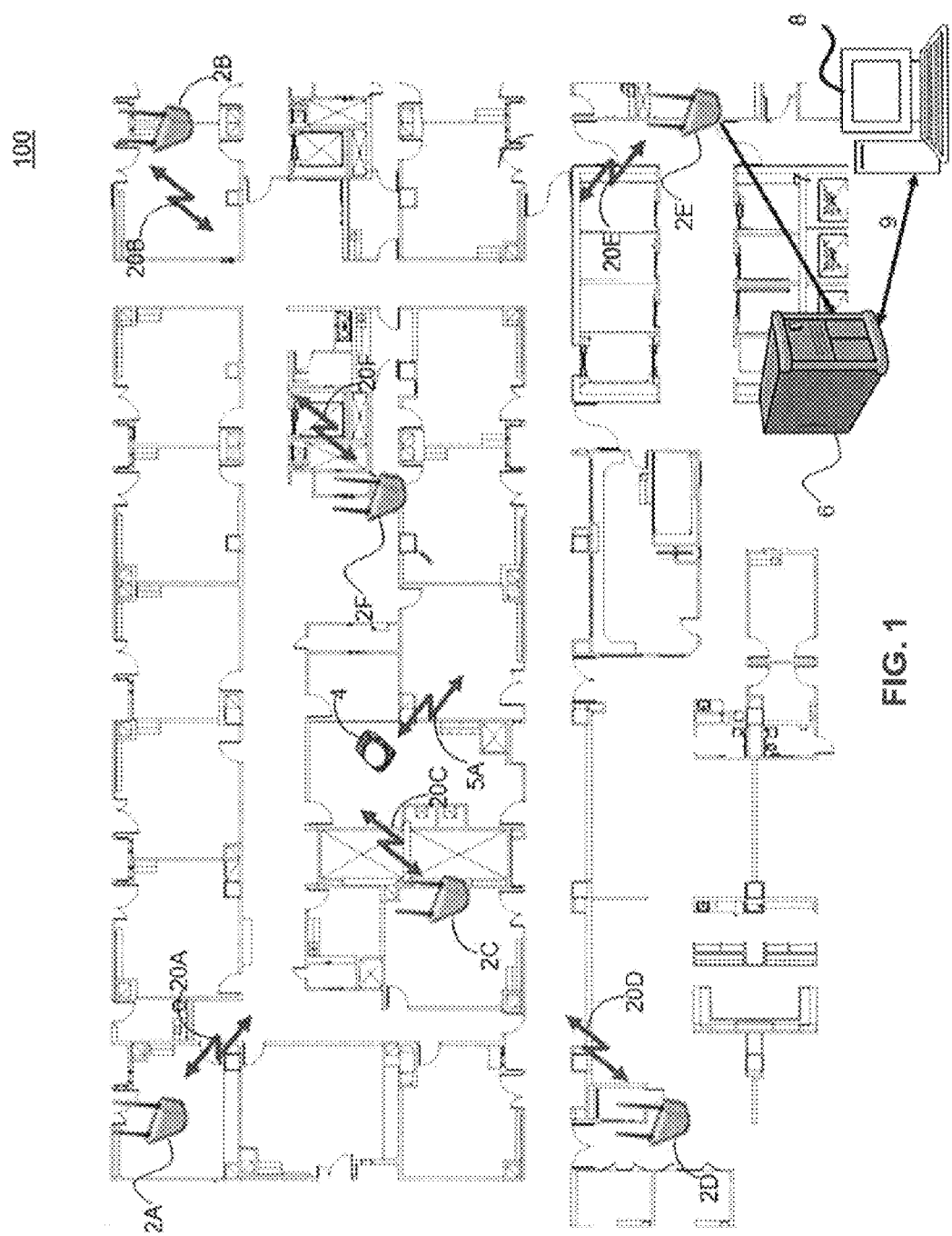
FIG. 1 is a diagram illustrating an exemplary system that may be used to implement aspects of the disclosure.

FIG. 1 is a diagram illustrating an exemplary system 100 that may be used to implement aspects of the disclosure. The type, number, and arrangement of elements illustrated in FIG. 1, and disclosed herein, may vary consistent with the disclosed embodiments.

In one embodiment, system 100 may include at least one wireless network, one or more wireless tags 4, one or more network components 2 (illustrated in exemplary form as components 2A-2E), a server 6, and a client 8. In one exemplary embodiment, the wireless network may be an IEEE 802.11x (e.g., IEEE 802.11a/b/g/ac/ad) network, an IEEE 802.15.4 network, a radio frequency identification (RFID) network, an infrared network, an optical network, an ultrasound network, a Bluetooth network, an ultra-wideband (UWB) network, a satellite network (e.g., GPS), or any other known wireless network that facilitates wireless communications. The wireless network may also be a combination of one or more of the aforementioned networks.

In one embodiment, a wireless tag (e.g., an active or passive RFID tag), such as wireless tag 4, may be attached to an asset, such as on the surface of an asset or affixed to a component of an asset. In accordance with certain disclosed embodiments, an asset may include any physical thing that can have a tag affixed to it. Assets may be powered assets, such as electronic equipment, or passive assets, such as a product. For instance, an asset may include any type of equipment, computer equipment (e.g., laptop, mobile device (e.g., smart phone, tablet), desktop computer, printer, router, server, gateway, computer rack equipment), tool (e.g., drill, power saw), tool accessory (e.g., tool case, tool compartment), warehouse item (e.g., storage container, box, crate, shelving unit, item, product), vehicle (e.g., car, truck, bus), vehicle part, ship, ship part, air transportation vehicle part, item, locomotive engine, locomotive cargo train, locomotive part, container, storage item medicine container, hospital bed, wheelchair, fixture, building or residence fixture, animal accessory (e.g., dog collar, horse saddle component), cargo container, product package, clothing or clothing accessory (e.g., shirt, belt, pants, hat, badge, jewelry), and any other type of movable physical thing that can host an affixed wireless tag (of any appropriate size). An asset may also include a living being, such as a pet or a company employee. An asset may be configured in a manner consistent with the disclosed embodiments. Powered assets with transmitters and/or receivers may be capable of communicating wirelessly without an attached wireless tag. As a result, powered assets may not require an attached wireless tag to operate in a manner consistent with the disclosed embodiments.

Server 6 may communicate with wireless tag 4 over one or more wireless communication links. In one aspect, server 6 may communicate with wireless tag 4 by way of network components 2A-2E. One or more of network components 2A-2E may be access points, base stations, routers, relay stations, or the like. Elements of system 100 may send and/or receive communication signals, such as signal 20A (to/from network component 2A), signal 20B (to/from network component 2B), signal 20C (to/from network component 2C), signal 20D (to/from network component 2D, signal 20E (to/from network component 2E), signal 7 (to/from component 2E, which for the sake of drawing simplicity represents links between network components 2A-2E and server 6), signal 5A (to/from wireless tag 4), and signal 9 (to/from client 8). Wireless tag 4 may communicate directly with server 6, or may communicate with server 6 via one or more of network components 2A-2E. The number of elements, components, devices, tags, assets, and signals shown in FIG. 1 is exemplary and not intended to be limiting. For example, while only a single wireless tag 4 is illustrated in FIG. 1, system 100 may contain several wireless tags, each being fixed to a corresponding asset. Indeed, in a warehouse or store setting, hundreds or even thousands of wireless tags may communicate with the wireless network. In certain aspects, system 100 operates consistent with the disclosed embodiments.

One or more of network components 2A-2E may be a wireless network component that is configured to process information for wireless communications. In one aspect, the wireless network component may be an access point, base station, router, relay station, or the like. The wireless network component may include one or more hardware elements, such as processors, and/or software elements, for implementing wireless communication mechanisms. The wireless communication mechanisms may enable the network component to send and/or receive and process data to/from a wireless tag 4, and/or send/receive data to/from other network elements, such as server 6, in accordance with the disclosed embodiments. For example, a wireless tag 4 may be programmed with information about the asset to which it is attached. Wireless tag 4 may then send the asset information to one or more of network components 2A-2E and/or server 6, such as asset type information describing the type of asset to which the tag is attached. The wireless tag may also send tag information, such as tag identification information or time stamp information, to one or more of network components 2A-2E and/or server 6.

At least one of network components 2A-2E may include one or more processors that execute software and program instructions to perform one or more processes consistent with certain aspects of the disclosure. At least one of network components 2A-2E may also include one or more memory devices that store software and/or program instructions that, when executed by the processor(s) of components 2A-2E, perform those processes.

Server 6 may include one or more computers that perform server processes, such as sending and/or receiving information over a network, processing information, and/or producing results of processed data. In one embodiment, server 6 may be a computer system that is configured to receive information from elements in the wireless network, such as one or more of network components 2A-2E, wireless tag 4, and/or client 8 to perform network processes, such as asset location processes. Server 6 may be configured to send commands and/or programming information to one or more of network components 2A-2E and/or wireless tag 4, to program the functionality of those components. Server 6 may also be configured to receive measurement information from one or more of network components 2A-2E and/or wireless tag 4, process that information, and generate results of the processed information. For example, server 6 may be configured to execute software that determines the location of assets to which wireless tag 4 is attached, based on data received from one or more of network components 2A-2E and/or wireless tag 4. Server 6 may be configured to generate and format results, and to send the results to client 8. For example, client 8 may request a display of information related to location system 100, such as location or location accuracy information, and server 6 may process and provide the results to client 8.

Server 6 may be configured to perform other processes in accordance with aspects of the disclosed embodiments. Server 6 may include, for example, one or more processors that execute instructions to perform processes consistent with aspects of the disclosed embodiments. Server 6 may also include one or more memory devices that store software and/or program instructions that, when executed by the one or more processors of server 6, perform one or more processes, such as the location processes, consistent with the disclosed embodiments.

Client 8 may be one or more computing devices, such as computer systems. For example, client 8 may include a general purpose or notebook computer, a mobile device with computing ability (e.g., smart phone, tablet, etc.), a server, a desktop computer, or any combination of these computers and/or affiliated components. Client 8 may be configured with one or more processors and one or more memory devices that store data and software instructions that are executable by the one or more processors. Client 8 may also include communication software that, when executed by a processor, provides communications with communication link 9, such as Web browser or other networking type software.

System 100 may include a wireless network that may be implemented in different environments for different applications. For example, system 100 may include a wireless network with network components located in different geographic locations. System 100 may be used, for example, in an outdoor environment, a warehouse environment, a store, a hospital, an office building with different floors, or a tunnel, though the disclosure is not so limited. For example, FIG. 1 illustrates an exemplary system 100 implemented in a building environment. As shown, system 100 includes a wireless network on a floor of a building, although system 100 may span multiple floors or exist in any other environment, including outdoor environments.

Wireless tag 4 may be configured to broadcast a wireless signal 5A, which may be received by at least one of the one or more network components 2A-2E and/or server 6. Wireless tag 4 may broadcast multiple signals at different times from different locations depending on the movement of wireless tag 4. For example, wireless tag 4 may be configured to automatically and periodically send broadcast signal 5A, and/or to do so in response to an instruction from an external device such as a network component 2A-2E, server 6, client 8, another network device, or a user. In one aspect, one or more of network components 2A-2E may be in wireless communication range of wireless tag 4.

In one aspect, wireless signal 5A may be a Wi-Fi Probe Request message, or a broadcast data message, but the disclosed embodiments are not so limited. Signal 5A may include information that may be used by one or more of network components 2A-2E, or any other component within range to receive signal 5A, to perform processes consistent with the disclosed embodiments. This information may include, for example, information identifying the asset to which the tag is attached, tag identification information, or time stamp information.

The disclosed embodiments may utilize a ranging and/or angulating technique to determine the location of an asset, such as to determine the location of an asset in system 100. The ranging and/or angulating technique may include, for example, received signal strength indication (RSSI), angle of arrival (AoA), line-of-sight (LoS), time of arrival (TOA), multilateration (time difference of arrival) (TDoA), time-of-flight (ToF), two-way ranging (TWR), symmetrical double sided—two way ranging (SDS-TWR), near-field electromagnetic ranging (NFER), or any combination of the above.

The accuracy of a positioning determination in a real-time locating system may be affected by a variety of factors. For example, a locating system consistent with the disclosed embodiments may depend upon a visible line-of-sight between network elements. Environmental conditions, including noise and multipath interference from elements and signals in the locating environment, may also have an impact on the accuracy of the positioning results.

The disclosed embodiments may calculate location errors by comparing a location of an asset determined by the locating system with a known location of the asset. Alternatively or additionally, the disclosed embodiments may calculate location errors by analyzing the quality of measurements reported by signals from one or more network components.

In one embodiment, the disclosed embodiments may determine one or more position error values based on the calculated location errors. In one aspect, the positioning error values may be spatial positioning error values. The error values may be described at different levels of granularity. For example, the disclosed embodiments may express spatial positioning error values as one or more of an x-y error (e.g., a spatial positioning difference between the determined location and the actual location of the asset on an x-y grid), a floor error (e.g., a spatial positioning difference between a determined floor and the actual floor where the asset is located), a room error (e.g., a spatial positioning difference between a determined room and the actual room where the asset is located), a bay error (e.g., a spatial positioning difference between a determined bay (e.g., a loading bay) and the actual bay where the asset is located), and a rack error (e.g., a spatial positioning difference between a determined rack (e.g., on a network server rack) and the actual rack where the asset is located).

In certain embodiments, server 6 may be configured to execute software instructions that perform processes for determining the location of an asset and determining and/or storing position error values. However, the disclosed embodiments are not so limited. For example, one of network components 2A-2E may perform one or more of these functions, and report the results to server 6.

Server 6 may also generate and store relationship information that relates the determined positioning error values to one or more metrics. This relationship may be stored, for example, in a table format, but the disclosed embodiments may store the relationship in other formats. In certain embodiments, a metric may include, for example, one or more of (1) a time required to physically locate an asset based on the asset location as estimated by the system; (2) a time required to physically locate a person; (3) an overhead cost of sending a person to the wrong place due to a positioning error of an asset as estimated by the locating system; (4) an overhead cost of placing an asset in the wrong location due to a positioning error of the locating system; (5) an overhead cost of not having the right equipment located in the right location at a certain time; (6) a cost of not properly charging service expenses to the right person; (7) a probability of physically locating an asset or person within a time limit based on positioning information as provided by the locating system; or (8) a probability of canceling or postponing a scheduled activity due to a location error.

Metric (1) may describe a time to physically locate (i.e. find during a search) an asset This metric may be used, for example, to represent situations where, for example, an asset was searched for in the wrong place (e.g., wrong building, floor, room, parking lot) due to a positioning error.

Metric (2) may describe a time to physically locate a person. This metric may be used, for example, to represent situations where a person was searched for in the wrong place (e.g., wrong building, floor, room, bed), due to a positioning error.

Metric (3) may describe an overhead cost of sending somebody to a wrong location. This metric may be used, for example, to represent an overhead cost in a situation where a person was sent to a wrong location due to a positioning error of an asset. For example, somebody may be sent to a wrong place to find a person and the overhead costs associated with sending that person could be saved if the person being searched for was located in the right place.

Metric (4) may describe an overhead cost of placing an asset in a wrong location. This metric may be used, for example, to represent an overhead cost in a situation where an asset was placed in a wrong location due to a positioning error of another asset or person. For example, a forklift being located or tracked by the locating system may be placing pallets in different places in a warehouse. Since the location of a pallet may be estimated based on a determined location of the forklift, a positioning error in the location of the forklift may also generate errors in locating the pallets.

Metric (5) may describe an overhead cost from not having the correct equipment in a correct place at a particular time. This metric may be used, for example, to represent an overhead cost in a situation where correct equipment was not in the correct place at a particular time due to a positioning error of another asset or person. For example, certain test equipment may be required in an assembly line, and a wrong positioning of that equipment may delay the testing process or let it start without having the test equipment in place.

Metric (6) may describe an overhead cost of having not properly charged service expenses to the correct person. This metric may be used, for example, to represent a cost in a situation where service expenses were not charged to the correct person as a result of a positioning error of an asset, medical equipment, a person, or a patient.

Metric (7) may describe a probability of physically locating an asset or person within a time limit. This metric may be used, for example, to represent a probability that an asset or person can be located within a time limit in an emergency situation, such as after a panic button has been pressed by a person in a distress situation.

Metric (8) may describe a probability to cancel or postpone a scheduled activity. This metric may be used, for example, to represent a probability that a scheduled activity will need to be canceled or postponed as a result of a location error. For example, the metric may represent a probability of a need to postpone a surgical operation due to a misplacement of medical equipment as a result of a positioning error.

While the discussion above describes eight exemplary metrics, the disclosed embodiments are not so limited. For example, other metrics providing useful information for a particular application, business, or industry may be utilized in addition to, or in place of, those discussed above.

As noted above, server 6 may store relationship information describing a relation between the positioning error values and the one or more metrics. The relation between one or more of the positioning error values of a location determination and a metric of the one or more metrics may be expressed by simple or complex mathematical functions (e.g., linear, exponential, logarithmic, non-continuous), a table, or any other suitable empiric relation. For example, a relation between a positioning error and a cost of searching for an asset may be set, such that the cost of searching for the asset grows exponentially as a function of the location error. The relation may be further set so that at a certain search time threshold (e.g., more than ten minutes of searching time) the cost jumps to a much higher cost. This jump in cost may be pre-set to account for situations where a new asset is purchased instead of continuing to search for the asset (e.g., the item is declared lost) or where a scheduled activity is canceled.

A cost of not being able to locate a position of a wireless tag (e.g., it has a dead battery and cannot communicate) may also be combined into a cost calculation. For example, this calculation may take into account a probability that the wireless tag was faulty or located in a place with no locating system network coverage.

In addition to using the positioning error values in calculating the one or more metrics, server 6 may also consider other parameters. For example, server 6 may take account of one or more of (1) an area; (2) a time of day; or (3) a type of asset. Parameter (1) may be used to account for the area for which the positioning error values were determined. For example, a time to find an asset given the estimated location of the locating system may vary between areas for the same positioning error values, and this parameter may allow calculations to take this timing variability into account. Parameter (2) may be used to account for the time of day in which for which the positioning error values were determined. For example, a time to find an asset may vary by time of day (e.g., a longer searching time at night than during the day), and this parameter may allow calculations to take this timing variability into account. Parameter (3) may be used to account for the type of asset for which the location was determined. For example, a time to find an asset may vary by type of asset (e.g., a large asset may be located more quickly than a small asset), and this parameter may allow calculations to take this timing variability into account.

While the discussion above describes three exemplary parameters, the disclosure is not so limited. For example, other parameters providing useful information for a particular application, business, or industry may be utilized in addition to those discussed above. Many different parameters, or a combination of one or more parameters, may be combined with positioning error values to calculate the one or more metrics.

Server 6 may include software or instructions on a memory device and one or more processors that executes the software or instructions. The software or instructions, when executed, may perform calculations to determine one or more metrics based on determined positioning error values, the relation information, one or more parameters, and/or pre-stored tables or functions. Server 6 may be configured with one or more rules to locate assets, carry out calculations, and determine metrics. The one or more rules may be in the form of software instructions that, when executed by a processor, are performed in accordance with the rule(s). Server 6 may also be configured with one or more rules for tabulating positioning error values, metrics, parameters, and/or other information for storing in tabulated form, sending to client 8, and/or presenting on a display and/or report. Server 6 may be pre-configured with one or more rules and/or may be configured with one or more rules received from client 8 and/or other network components. For example, a user of client 8 may program server 6 with one or more rules over network link 9. Client 8 may provide the user with a web browser or other user interface that allows the user to configure one or more of the rules stored in server 6.

While server 6 is described above as performing calculations, calculating metrics, and being configured by one or more rules, the disclosure is not so limited. For example, one of network components 2A-2E may perform one or more of these functions. Results may then be reported to server 6, or directly to client 8.

Having calculated the one or more metrics, server 6 may tabulate one or more positioning error values, metrics, parameters, and/or other data for storing in tabulated form, sending to client 8, and/or presenting on a display and/or in a report. For example, the positioning error values, metrics, parameters, and/or other data may be processed for rendering as information in tables, graphs, pictures, heat maps, events, and/or messages. The rendered information may be output, for example, on a display connected to server 6, on paper printed from a printer, or to client 8 for rendering on a display attached to client 8. In one embodiment, the information may be rendered in a markup language as a webpage, so that a user of client 8 may access the information with a web browser.

The disclosed embodiments may execute software to generate one or more interfaces that are displayed to a user of client 8 or server 6. For example, a user of client 8 or server 6 may utilize a user interface, such as a web browser, to perform simulations based on the rendered information. For example, server 6 may calculate and present a performance versus cost metric to the user. The user may manipulate the user interface to maximize this metric. In response, server 6 may execute software instructions that simulate positioning error values, metrics, parameters and/or other data to obtain results expected by the location system if the manipulated metric were to be maximized. As another example, server 6 or client 8 may execute software that provides one or more interfaces that enable a user to manipulate the user interface to maximize a metric in order to minimize a probability of missing a particular goal. The software, when executed, may allow the user to prioritize this metric, even if this were to increase errors in locating assets, if the user determines that meeting this particular goal is important.

Server 6 or client 8 may further execute software that provides interface(s) that allow a user to manipulate various positioning error values, metrics, parameters, and/or other data to analyze tradeoffs and costs and benefits between the various presented information in the interface(s). For example, a user may understand that large location errors cause large cost impacts, and may prefer to reduce large location errors to a minimum, while at the same time allowing an increase in average location error. Server 6 or client 8 may execute software that generates interface(s) that allow a user to estimate an expected return on investment (ROI) of a location system. For example, the user may enter information in an interface indicating that he/she expects the location system to search for or locate one thousand assets per day. Based on entry of this information, server 6 (or client 8) may calculate an estimated ROI and present it to the user in an interface. Thus, for example, the user may use the rendered information and user interface to compare scenarios of a location system in order to evaluate or improve the location system for a particular industry, business, or application. Server 6 or client 8 may execute software that performs the comparisons, and any other calculations or processes disclosed above, in response to input from the user via the interface(s).

Figure 2:
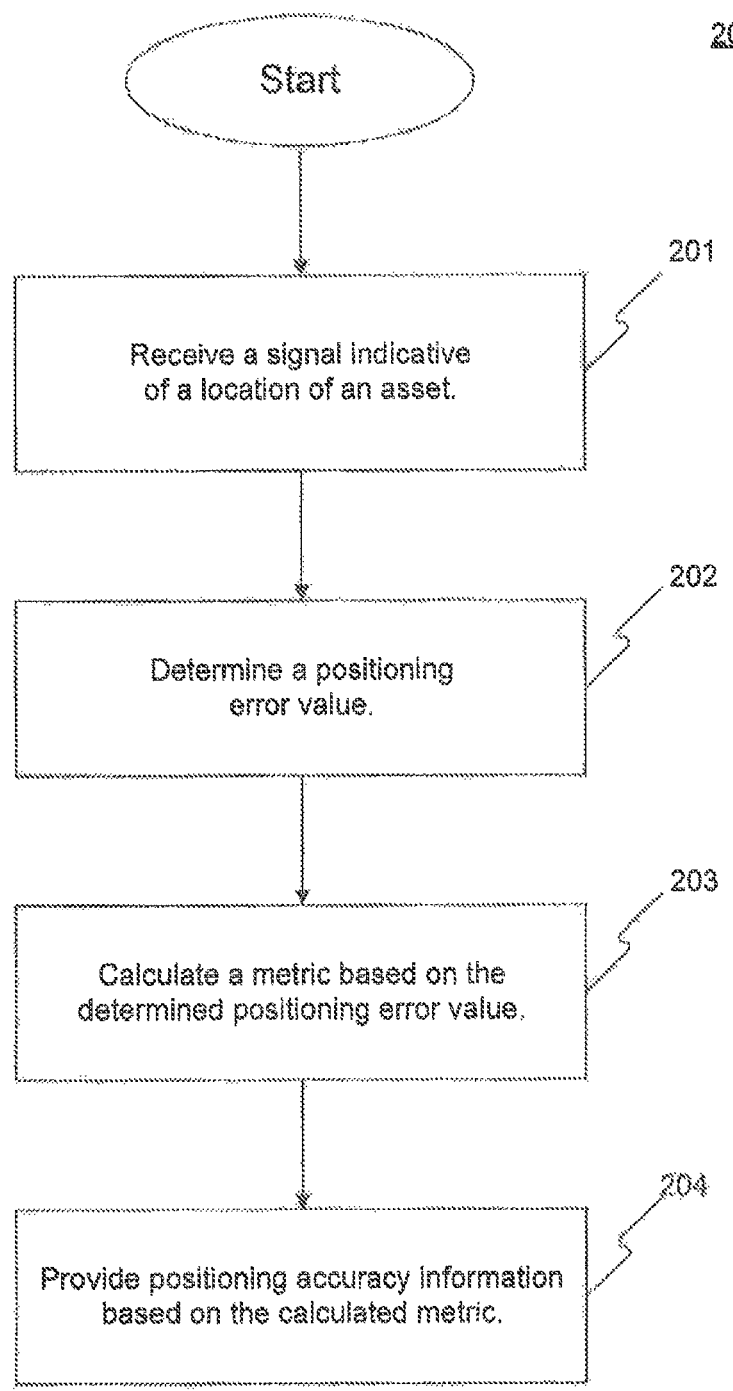
FIG. 2 is a flow diagram illustrating an exemplary positioning accuracy process consistent with disclosed embodiments.

FIG. 2 shows a flow diagram of an exemplary process 200 performed by server 6 to calculate and present a positioning performance of a locating system, such as an RTLS. The locating system may be used to identify and track the location of assets. A method of locating an asset may be initiated by server 6, wireless tag 4, any of network components 2A-2E, client 8, or any other network device. System 100 may utilize any suitable ranging and/or angulating technique in order to determine the location of an asset. For example, the ranging and/or angulating technique may include, for example, signal strength (RSSI), angle of arrival (AoA), line-of-sight (LoS), time of arrival (TOA), multilateration (time difference of arrival) (TDoA), time-of-flight (ToF), two-way ranging (TWR), symmetrical double sided—two way ranging (SDS-TWR), near-field electromagnetic ranging (NFER), or any combination of the above. One or more of network components 2A-2E may collect information regarding the location of the asset based on the location technique, and may report the information to server 6.

In step 201, server 6 may receive a signal from one or more of network components 2A-2E containing information indicative of the location of the asset. In step 202, based on the received information, server 6 may determine one or more positioning error values based on the locating of the asset. For example, server 6 may estimate a location of the asset based on the received signal, and determine one or more positioning error values by comparing the estimated location with a known location of the asset. In one embodiment, server 6 may determine one or more positioning error values based on a quality of one or more measurements related to the received signal, such as a signal-to-noise ratio (SNR) or geometric dilution of precision (GDOP). Alternatively, one or more of network components 2A-2E may determine the one or more positioning error values and report them to server 6.

In step 203, server 6 may calculate one or more metrics based on the determined one or more positioning error values. The one or more metrics may be calculated using mathematical functions, tables, or other empiric relations. The one or more metrics may include, for example, one or more of a time to physically locate an asset, a time to physically locate a person, an overhead cost of sending a person to a wrong location, an overhead cost of placing an asset in a wrong location, an overhead cost of not having the right equipment located in the right location at a certain time, a probability of physically locating an asset or person within a time limit, or a probability of canceling or postponing a scheduled activity. In one embodiment, server 6 may also include one or more additional parameters in the calculation of the one or more metrics. The one or more additional parameters may include, for example, one or more of an area, a time of day, or a type of asset.

In step 204, server 6 may provide positioning accuracy information based on the calculated one or more metrics. For example, server 6 may store and/or provide information for display regarding one or more of estimated times to physically locate assets and/or personnel, overhead costs associated with mistakes made as a result of positioning errors, probabilities of physically locating assets and/or personnel within a designated period of time, probabilities of canceling or postponing scheduled activities on the basis of positioning errors, costs of locating assets, sizes and/or probabilities of location errors, or ROI based on the configuration of the locating system.

While process 200 is described above as being performed by server 6, the disclosed embodiments are not so limited. For example, one or more of network components 2A-2E or client 8 may perform process 200.

Figure 3:
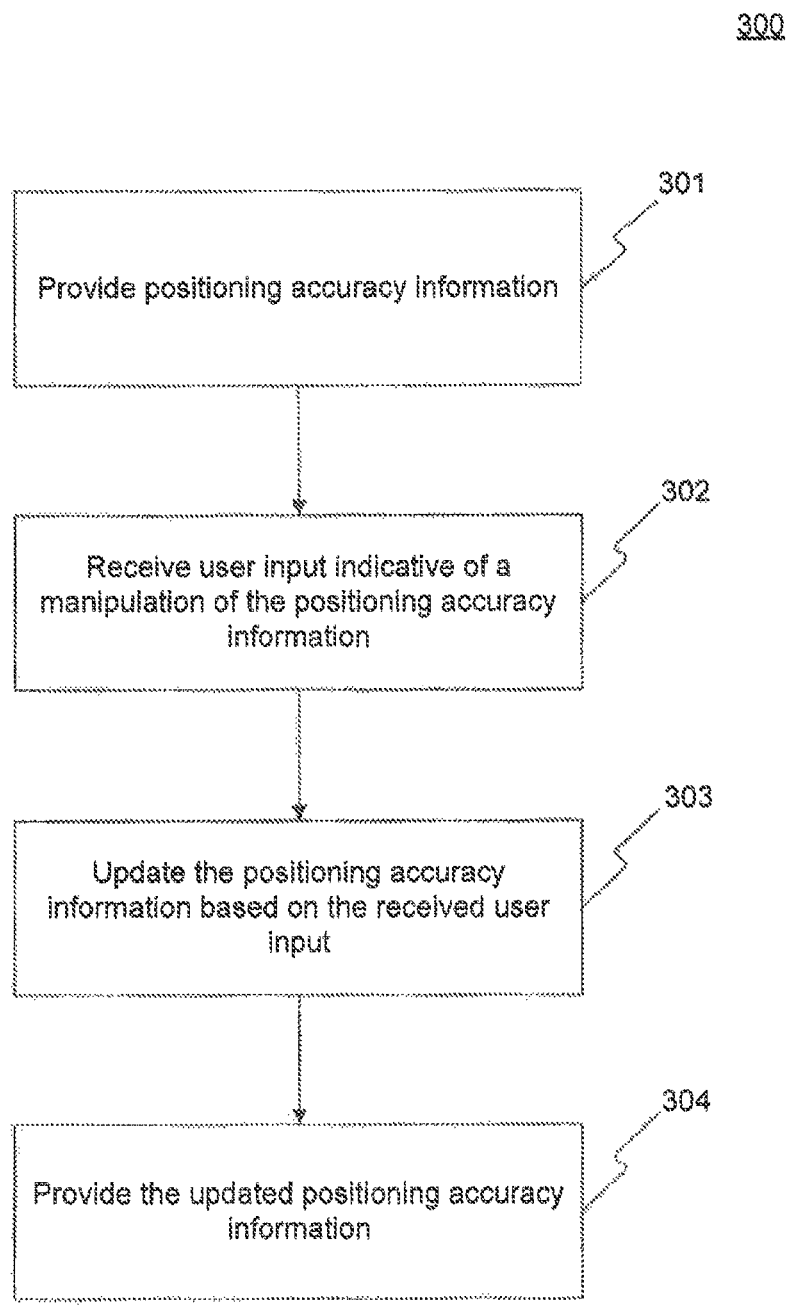
FIG. 3 is a flow diagram illustrating another exemplary positioning accuracy updating process consistent with disclosed embodiments.

FIG. 3 depicts a flow diagram of an exemplary process performed by server 6 for presenting positioning accuracy information of a locating system. In step 301, server 6 may provide positioning accuracy information based on one or more calculated metrics. For example, positioning accuracy information may be provided for rendering on a local display or sent to client 8 for rendering on a display connected to client 8. The positioning accuracy information may be displayed in a user interface, such as in a web page format in a web browser. The positioning accuracy information may be displayed in one or more formats, such as in tables, graphs, pictures, heat maps, events, or messages. The user interface enables the user to manipulate displayed values, metrics, parameters, and/or other data of the positioning accuracy information to perform simulations based on the displayed information. For example, a user may manipulate the user interface to maximize or minimize displayed values, metrics, parameters, and/or other displayed data.

In step 302, after a user has manipulated positioning accuracy information in the user interface, server 6 may receive the user input indicative of the manipulation of the positioning accuracy information. In step 303, based on the changes made by the user, server 6 may recalculate one or more of the metrics, values, parameters, and other data to calculate one or more updated metrics, values, parameters, and other data for the positioning accuracy information. In step 304, server 6 may provide the updated positioning accuracy information for display.

Figure 4:
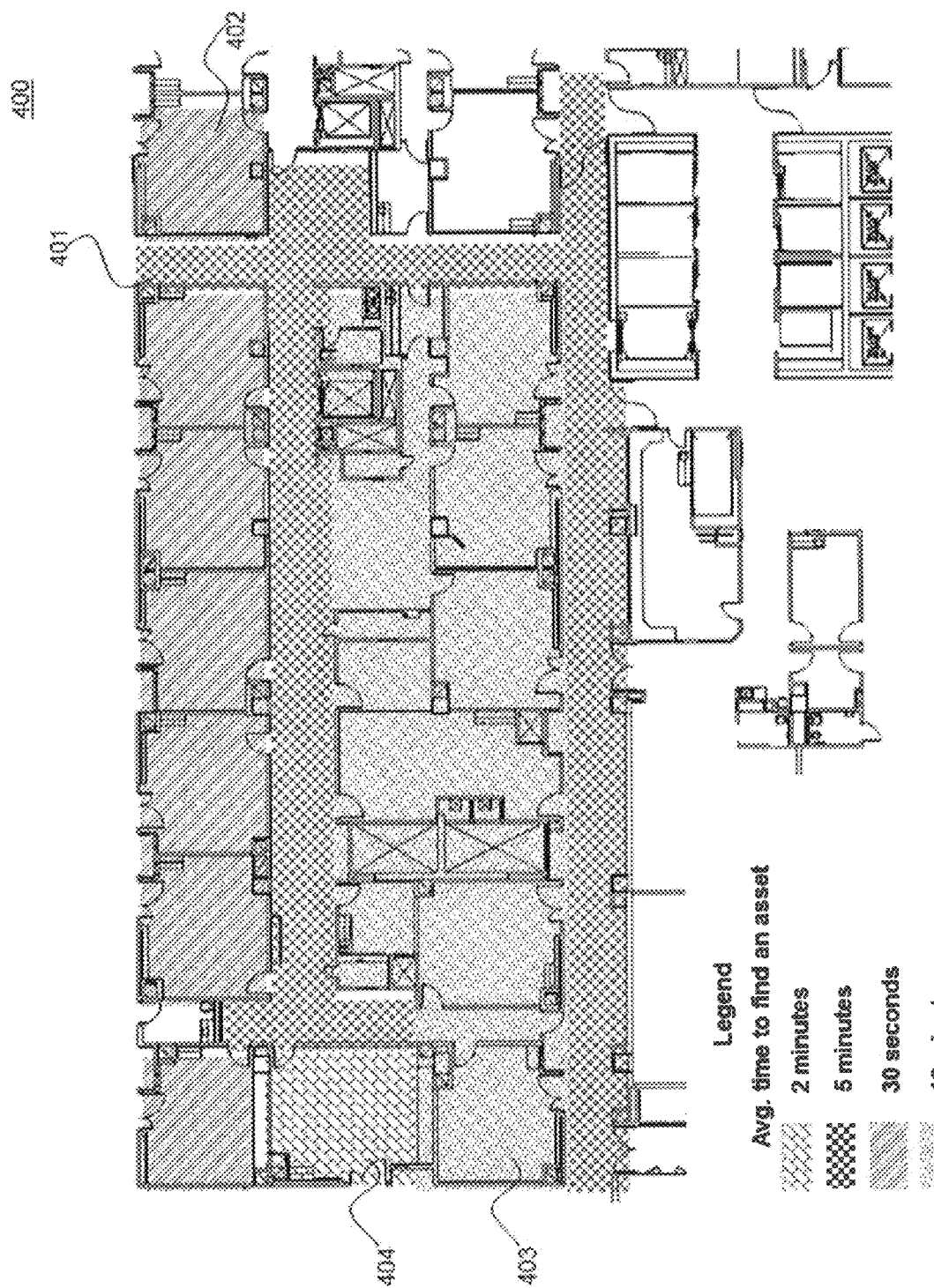
FIG. 4 is an exemplary diagram reflecting positioning accuracy information, consistent with disclosed embodiments.

FIG. 4 is an exemplary diagram of an interface 400 showing positioning accuracy information, consistent with disclosed embodiments. In one aspect, as shown in FIG. 4, the positioning accuracy information may be displayed as an average time to physically locate an asset based on different areas on a floor of a building. The information may be provided for rendering in a manner that is easy for a user to comprehend. For example, in interface 400, different areas of the building floor are shaded with different patterns, and a legend is provided with positioning accuracy information that varies across the different areas. For example, interface 400 provides average times to physically locate an asset in different areas of the floor. In area 401, the average time to physically locate an asset is five minutes. In area 402, the average time to physically locate an asset is thirty seconds. In area 403, the average time to physically locate an asset is ten minutes. In area 404, an average time to physically locate an asset is two minutes.

Figure 5:
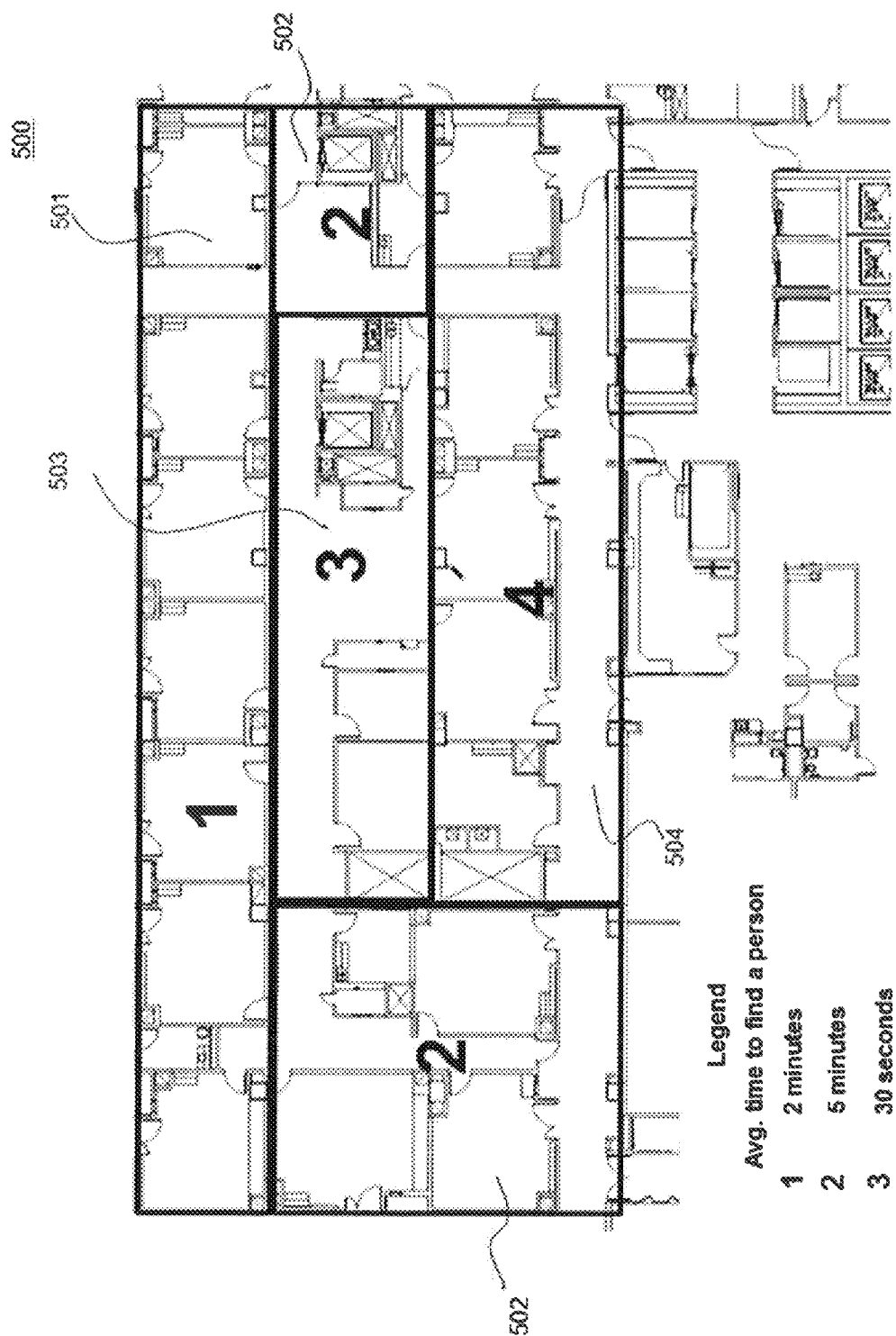
FIG. 5 is another exemplary diagram reflecting positioning accuracy information, consistent with disclosed embodiments.

FIG. 5 is an exemplary diagram of an interface 500 showing positioning accuracy information, consistent with disclosed embodiment. In one aspect, as shown in FIG. 5, the positioning accuracy information may be displayed as an average time to physically locate a person, such as an employee, based on different areas on a floor of a building. For example, in interface 500, different areas of the building floor are numbered and designated with borders, and a legend is provided with positioning accuracy information that varies across the different areas. For example, interface 500 may provide average times to physically locate a person in different areas of the floor. In area 501, corresponding to area 1, the average time to physically locate a person is two minutes. In area 502, corresponding to area 2, the average time to physically locate a person is five minutes. In area 503, corresponding to area 3, the average time to physically locate a person is thirty seconds. In area 504, corresponding to area 4, the average time to physically locate a person is one minute.

FIG. 6 is an exemplary diagram of an interface 600 showing positioning accuracy information in tabular form, consistent with disclosed embodiments. In one aspect, as shown in FIG. 6, the positioning accuracy information may be displayed as an average time to physically locate an asset and a probability of physically locating an asset within two minutes based on different rooms of a building. For example, in interface 600, different room numbers 501-504 may be listed and the average time to locate an asset and the probability of physically locating an asset within two minutes are displayed for each room. Screen shot 600 further provides a total average time to physically locate an asset among room numbers 501-504, and a total average probability of physically locating an asset among room numbers 501-504.

FIG. 7 is an exemplary diagram of an interface 700 showing positioning accuracy information in tabular form, consistent with disclosed embodiments. In one aspect, as show in FIG. 7, a variety of positioning accuracy information may be displayed. Interface 700 may include a tabulation of the total cost spent on searching for assets in different areas of a business. In screen shot 700, these areas include an Assembly area, a Quality Assurance Area, a Warehouse area, and a Delivery area. Interface 700 may also provide information showing a total searching cost of the business across these areas. Interface 700 may further include information showing that a user may focus in on one of the areas to gain a more detailed breakdown of the positioning accuracy information for a specific area. For example, interface 700 may include information that focuses on an Assembly area. In one embodiment, a user may utilize a mouse, keyboard, touch screen, or any other known input device to select the Assembly area on the interface 700, and in response to user's input, the disclosed embodiments may generate an interface showing a detailed breakdown of the positioning accuracy information for that area. For example, interface 700 shows a table providing, for each room in the Assembly area, an average time to physically locate an asset, an average cost to physically locate an asset, an average number of assets searched per month, and a total searching cost. Interface 700 may further show a total average time to locate an asset across the rooms, and a total cost of searching for an asset across the rooms. In certain aspects, interfaces similar to interface 700 may be useful to a user in determining an ROI on a location system.

In certain aspects, the interfaces described above in connection with FIGS. 4-7 may be generated by server 6, client 8, and/or network component(s) 2A-2E. In some embodiments, server 6 and client 8 may perform operations in combination to provide interfaces consistent with the disclosed embodiments. For example, server 6 may be configured to provide interface(s) in the form of web pages that are accessible by client 8 via a web browser or similar software. In other aspects, server 6 may provide content to client 8 for display on an interface presented in a display device of client 8.

Figure 8:
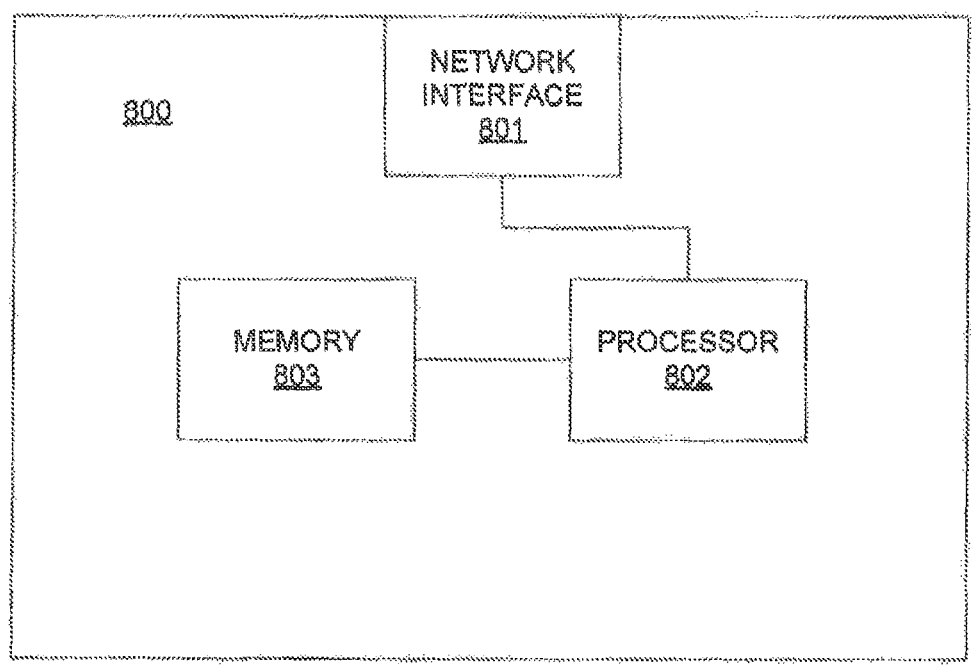
FIG. 8 is a diagram of an exemplary server consistent with disclosed embodiments.

FIG. 8 depicts an exemplary server 800 consistent with the disclosed embodiments. In one embodiment, server 800 may correspond to server 6 of FIG. 1. Server 800 may transmit and receive communications from other elements within a wireless network, such as from one or more routers, servers, base stations, network components, wireless tags, and client devices.

Data signals transmitted to and from network component 800 may be transmitted and received through a network interface unit 801. A processor 802 may be one or more known processing devices, such as a microprocessor, controller, or any other suitable type of processor. The functions of processor 802 may be provided on a single dedicated processor or by a plurality of processors. Processor 802 may be coupled to network interface unit 801, and a memory 803. Processor 802 may receive and/or transmit commands from/to other devices over one or more wireless networks, such as cellular, satellite, IEEE 802.11x, Wi-Fi, terrestrial, WiMax, or other wireless networks.

Memory 803 may be configured to store instructions and/or software that, when executed by processor 802, carry out the exemplary steps of the disclosed embodiments. Memory 803 may also store an operating system, applications, and/or parameters. Data stored on memory 803 may be stored in a single dedicated memory, or a plurality of memory devices. Memory 803 may be any type of physical, non-transient memory, volatile or non-volatile, removable or nonremoveable, including, but not limited to, random access (RAM), read-only (ROM), magnetic storage, semiconductor storage, optical disc storage, magneto-optical disc storage, or other type of storage device or tangible computer-readable medium. In one embodiment, memory 803 may include one or more programs or subprograms that, when executed by a processor, perform various procedures, operations, or processes consistent with disclosed embodiments.

The foregoing descriptions have been presented for purposes of illustration and description. They are not exhaustive and do not limit the disclosed embodiments to the precise form disclosed. Modifications and variations are possible in light of the above teachings or may be acquired from practicing the disclosed embodiments. For example, the described implementation includes software, but the disclosed embodiments may be implemented as a combination of hardware and software. Additionally, although disclosed aspects are described as being stored in a memory on a computer, one skilled in the art will appreciate that these aspects can also be stored on one or more other types of tangible computer-readable media, such as secondary storage devices, like hard disks, floppy disks, CD-ROMs, or other forms of RAM or ROM.

Computer programs based on the written description and disclosed methods are within the capabilities of one of ordinary skill in the art. The various programs or program modules may be created using any of the techniques known to one skilled in the art, or may be designed in connection with existing software. For example, program sections or program modules may be designed in or by means of DirectX, .Net Framework, .Net Compact Framework, Visual Basic, C, XML, Java, C++, JavaScript, HTML, HTML/AJAX, or any other now known or later created programming language. One or more of such software sections or modules may be integrated into a computer system.

Other embodiments will be apparent to those skilled in the art from consideration of the specification and practice of the embodiments disclosed herein. The recitations in the claims are to be interpreted broadly based on the language employed in the claims and are not limited to examples described in the present specification or during the prosecution of the application, which examples are to be construed non-exclusive. Further, the steps of the disclosed methods may be modified in any manner, including by reordering steps and/or inserting or deleting steps. As used herein, indefinite articles "a" and "an" mean "one or more" in open-ended claims containing the transitional phrase "comprising," "including," and/or "having." Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

What is claimed is:

1. A computer-implemented method for determining a positioning performance of a location system, comprising:
   receiving a signal indicative of a determined location of an asset;
   determining, by a processor, a positioning error value based on the received signal, the positioning error value indicating an error in the determined location of the asset;
   calculating a metric as a function of the positioning error value; and
   providing positioning performance information based on the calculated metric.

2. The method of claim 1, wherein the positioning error value indicating an error is based on an estimated location of the asset.

3. The method of claim 1, wherein the metric is one of:
   a time to physically locate the asset;
   a time to physically locate a person;
   an overhead cost of sending a person to the wrong place due to a positioning error of the asset;
   an overhead cost of placing the asset in a wrong location;
   an overhead cost of not having the right equipment located in the right location at a certain time;
   a cost of not properly charging service expenses to the correct person;
   a probability of locating the asset or a person within a time limit; or
   a probability of canceling or postponing a scheduled activity due to a location error.

4. The method of claim 1, wherein calculating the metric includes:
   calculating the metric as a function of the positioning error value and a parameter.

5. The method of claim 1, further comprising providing the positioning performance information based on a probability of a location error.

6. The method of claim 4, wherein the parameter may include one or more of:

an area in which the asset was located;
a time of day in which the asset was located; and
a type of the asset.

7. The method of claim 1, wherein the positioning error value is indicative of a difference between the determined location of the asset and an actual location of the asset.

8. The method of claim 1, further comprising:
receiving a user input indicative of a manipulation of the positioning performance information;
updating the positioning performance information based on the received user input; and
providing the updated positioning performance information.

9. The method of claim 8, wherein the user input indicates a maximization of the metric.

10. The method of claim 1, wherein the positioning performance information is provided for determining a return on investment of the location system.

11. The method of claim 1, wherein the positioning performance information is provided for determining an estimated time to locate an asset.

12. A system for determining a positioning performance of a location system, comprising:
at least one memory device storing instructions; and
at least one processor that, when executing the instructions, is configured to:
receive a signal indicative of a determined location of an asset;
determine a positioning error value based on the received signal, the positioning error value indicating an error in the determined location of the asset;
calculate a metric as a function of the positioning error value; and
provide positioning performance information based on the calculated metric.

13. The system of claim 12, wherein the positioning error value indicating an error is based on an estimated location of the asset.

14. The system of claim 12, wherein the metric is one of:
a time to physically locate the asset;
a time to physically locate a person;
an overhead cost of sending a person to the wrong place due to a positioning error of the asset;
an overhead cost of placing the asset in a wrong location;
an overhead cost of not having the right equipment located in the right location at a certain time;
a cost of not properly charging service expenses to the correct person;
a probability of locating the asset or a person within a time limit; or a probability of canceling or postponing a scheduled activity due to a location error.

15. The system of claim 12, wherein calculating the metric includes:
calculating the metric as a function of the positioning error value and a parameter.

16. The system of claim 12, further comprising providing the positioning performance information based on a probability of a location error.

17. The system of claim 15, wherein the parameter may include one or more of:
an area in which the asset was located;
a time of day in which the asset was located; and
a type of the asset.

18. The system of claim 12, wherein the positioning error value is indicative of a difference between the determined location of the asset and an actual location of the asset.

19. The system of claim 12, further comprising:
receiving a user input indicative of a manipulation of the positioning performance information;
updating the positioning performance information based on the received user input; and
providing the updated positioning performance information.

20. The system of claim 12, wherein the positioning performance information is provided for determining a return on investment of the location system.

21. The method of claim 12, wherein the positioning performance information is provided for determining an estimated time to locate the asset.

22. A non-transitory computer-readable medium storing instructions that, when executed by a processor, cause the processor to perform a method, the method comprising:
receiving a signal indicative of a determined location of an asset;
determining a positioning error value based on the received signal, the positioning error value indicating an error in the determined location of the asset;
calculating a metric as a function of the positioning error value; and
providing positioning performance information based on the calculated metric.

23. The non-transitory computer-readable medium of claim 22, wherein the positioning error value indicating an error is based on an estimated location of the asset.

24. The non-transitory computer-readable medium of claim 22, wherein the metric is one of:
a time to physically locate the asset;
a time to physically locate a person;
an overhead cost of sending a person to the wrong place due to a positioning error of the asset;
an overhead cost of placing the asset in a wrong location;
an overhead cost of not having the right equipment located in the right location at a certain time;
a cost of not properly charging service expenses to the correct person;
a probability of locating the asset or a person within a time limit; or
a probability of canceling or postponing a scheduled activity due to a location error.

25. The non-transitory computer-readable medium of claim 22, wherein calculating the metric includes:
calculating the metric as a function of the positioning error value and a parameter.

26. The method of claim 22, further comprising providing the positioning performance information based on a probability of a location error.

27. The method of claim 25, wherein the parameter may include one or more of:
an area in which the asset was located;
a time of day in which the asset was located; and
a type of the asset.

28. The method of claim 22, wherein the positioning error value is indicative of a difference between the determined location of the asset and an actual location of the asset.

29. The non-transitory computer-readable medium of claim 22, the method further comprising:
receiving a user input indicative of a manipulation of the positioning performance information;
updating the positioning performance information based on the received user input; and
providing the updated positioning performance information.

30. The non-transitory computer-readable medium of claim 29, wherein the user input indicates a maximization of the metric.

31. The non-transitory computer-readable medium of claim 22, wherein the positioning performance information is provided for determining a return on investment of the location system.

32. The non-transitory computer-readable medium of claim 22, wherein the positioning performance information is provided for determining an estimated time to locate the asset.

* * * * *